United States Patent [19]
Atherton

[11] Patent Number: 5,924,639
[45] Date of Patent: Jul. 20, 1999

[54] LINE-TYPE INDICATOR FOR SPOOL ON A FISHING REEL

[75] Inventor: Randy L. Atherton, Anniston, Ala.

[73] Assignee: Brunswick Corporation, Tulsa, Okla.

[21] Appl. No.: 08/728,095

[22] Filed: Oct. 9, 1996

[51] Int. Cl.[6] .................................................. A01K 89/00
[52] U.S. Cl. .................... 242/322; 242/223; 242/311; 242/118.32; 242/912; 116/309; 116/313; 116/315; 116/317
[58] Field of Search .................................. 242/223, 224, 242/311, 322, 118.32, 323, 912; 401/493, 501; 116/307, 309, 311, 312, 313, 315, 317, 319, 320

[56] References Cited

U.S. PATENT DOCUMENTS

| | | |
|---|---|---|
| 2,596,374 | 5/1952 | Crapster . |
| 3,888,011 | 6/1975 | Hunt, Jr. .............................. 242/223 X |
| 4,203,565 | 5/1980 | Puryear . |
| 4,501,370 | 2/1985 | Kelley . |
| 4,762,290 | 8/1988 | Emura et al. . |
| 5,292,087 | 3/1994 | Sato . |
| 5,370,329 | 12/1994 | Kono .................................. 116/309 X |
| 5,568,787 | 10/1996 | Forslund ................................ 116/307 |

*Primary Examiner*—Donald P. Walsh
*Assistant Examiner*—Emmanuel M. Marcelo
*Attorney, Agent, or Firm*—Wood, Phillips, VanSanten, Clark & Mortimer

[57] ABSTRACT

A fishing reel having a frame and an operating mechanism on the frame. The operating mechanism includes a line carrying spool with a first structure operable for directing line onto the spool. Settable structure on the spool can be placed selectively in at least first and second different states which are each detectable by a user. The settable structure is placeable selectively in the first state to give a user a detectable indication that a first type of line is on the spool and in a second state to give the user a detectable indication that a second type of line is on the spool.

21 Claims, 2 Drawing Sheets

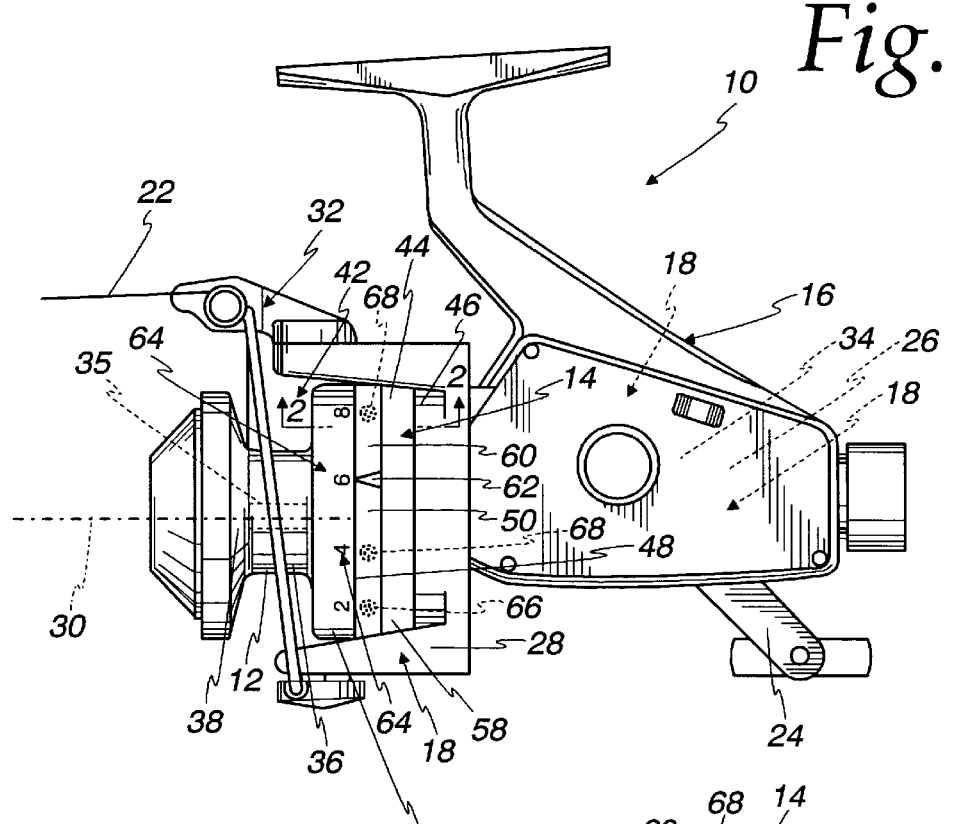
Fig. 1
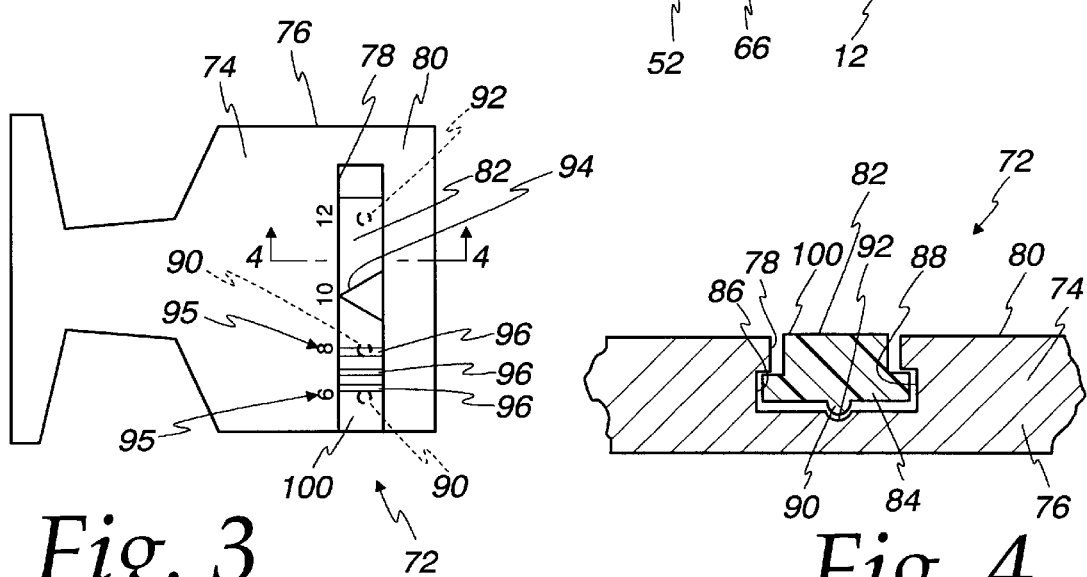
Fig. 2
Fig. 3
Fig. 4

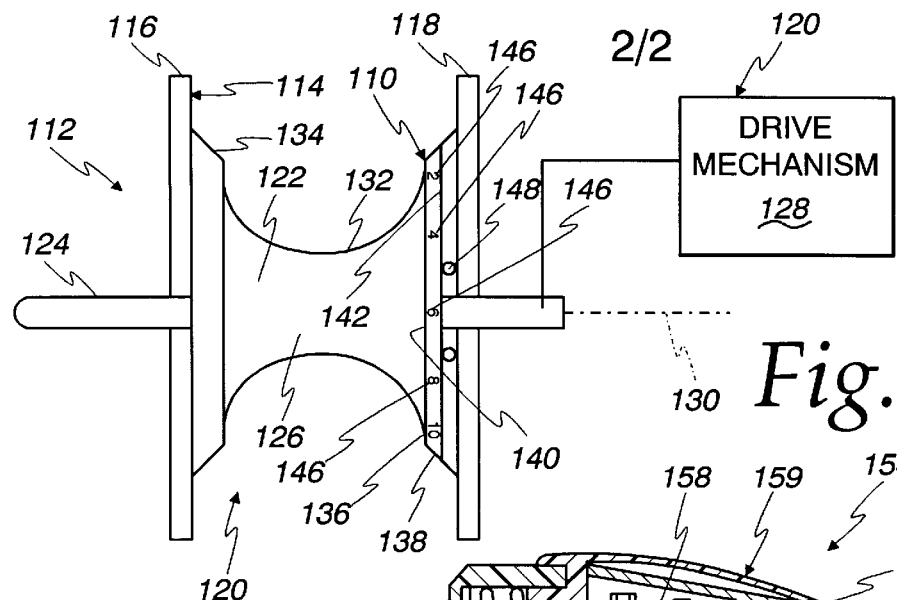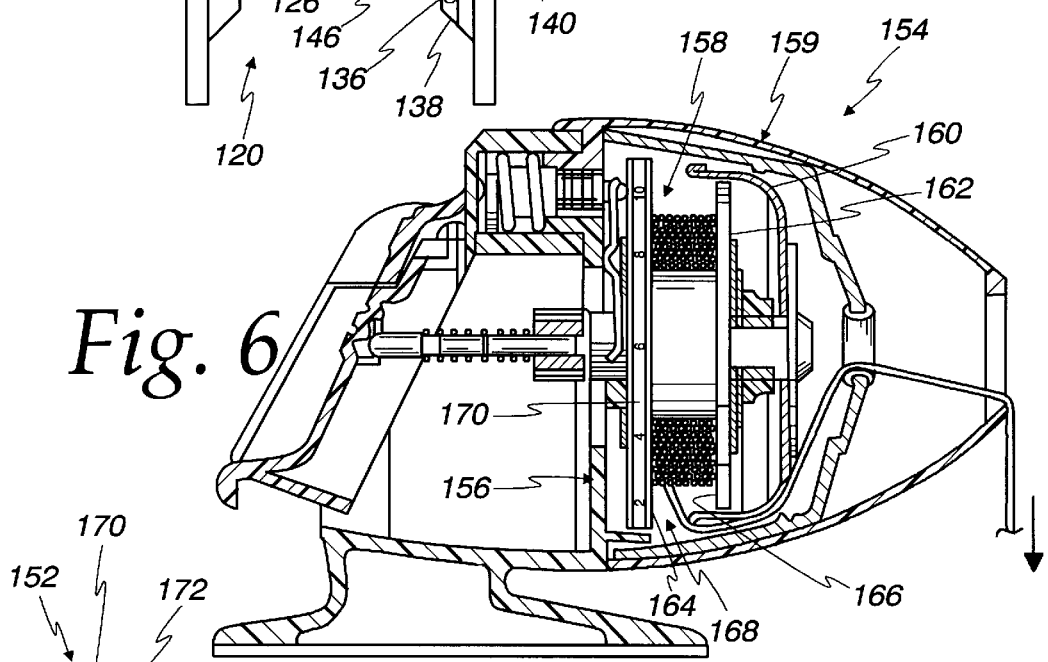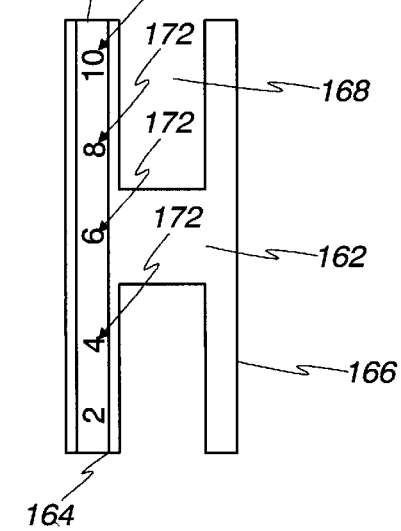

LINE-TYPE INDICATOR FOR SPOOL ON A FISHING REEL

BACKGROUND OF THE INVENTION

1. Field of the Invention

This invention relates to fishing reels of the type having a spool for retaining a supply of fishing line and, more particularly, to settable structure on the spool to indicate to a user which of multiple different types of line are on the spool.

2. Background Art

It is common for anglers to use different strengths of line for different types of fishing. To facilitate changing from one line type to another, it is known to construct virtually all different types of fishing reels, i.e. baitcast, spinning spincast closed face, etc. with removable spools. This permits the user to keep a plurality of interchangeable spools on hand, each with a different type of line.

Once line is placed on a spool, it may be difficult to ascertain its strength by simple inspection. While experienced anglers can detect gross differences in line strength by a visual inspection, the difference between lines with different but relatively close strengths may not be readily determinable by a user. Accordingly, line type indicators have been devised to give users a visual indication of what type of line is on a spool.

In a most basic form a user can put a tag or label on a spool and on the tag or label identify the line type. Tags and labels are prone to failing off. Additionally, it is inconvenient to keep on hand a supply of tags or labels and to physically apply the tag or label.

As a convenience to the user, a line type indicator has been incorporated into fishing reels, as shown in U.S. Pat. No. 4,203,565, to Puryear. In the Puryear patent, a removable spool is provided on a shaft on a fishing reel. After the spool is assembled, a dial is snap fit to the shaft and can be set to indicate a particular line type. While this system performs adequately with the reel assembled, to disassemble the spool, the dial must be initially removed and separated from the shaft. As a result, there is no line type indicator that remains with the spool, as a result of which the user cannot determine precisely what line is on a collection of spools that may be on hand without some other identifying means.

Another type of line indicator is shown in U.S. patent application Ser. No. 08/558,387, commonly assigned with the present invention. In that application, a line type indicator is shown that is rotatable with a crank handle. The indicator includes a dial that is rotatable into different positions to identify different line types. In the event that the spool is removed from the reel and the indicator dial is rotated to identify the new line type put on the reel, the user has no means of determining at a later time what line is on the removed spool.

It is also known to incorporate line type indicators on a drag knob associated with the fishing reel. Since the indicator again remains with the fishing reel after the spool is removed, the user is unable to determine line type from the separated spool, other than by analyzing the line by applying a test force.

SUMMARY OF THE INVENTION

In one form of the invention, a fishing reel is provided having a frame and an operating mechanism on the frame. The operating mechanism includes a line carrying spool with first structure operable for directing line onto the spool. Settable structure on the spool can be placed selectively in at least first and second different states which are each detectable by a user. The settable structure is placeable selectively in the first state to give a user a detectable indication that a first type of line is on the spool and in a second state to give the user a detectable indication that a second type of line is on the spool.

In one form, the spool has a body and the settable structure includes a switch that is mounted to the body for movement relative to the body between first and second positions corresponding to the first and second states for the settable structure.

In one form, there are first and second indicating marks on one of the spool body and the switch and an indicator on the other of the spool body and the switch, with the indicator being alignable a) with the first indicating mark with the settable structure in the first state and b) with the second indicating mark with the settable structure in the second state.

The switch may extend continuously around a part of the spool body.

In one form, the spool body has a curved external surface and the switch is mounted at the curved external surface. The switch may have a curvature matched to the curved external surface.

The settable structure may further include structure cooperating between the switch and spool body for releasably maintaining the switch consistently in each of the first and second positions.

In one form, the settable structure includes a groove on one of the switch and spool body and a surface on the other of the switch and spool body that moves guidingly within the groove as the switch moves between the first and second position.

In one form, the spool has a substantially cylindrical shape with an external wall having a curvature and the groove and the surface that moves in the groove are curved to match the curvature of the external spool wall.

In one form, the external spool wall has a substantially cylindrical outer surface and the switch does not extend significantly radially outwardly from the cylindrical outer surface.

An exposed surface on the switch may have a raised pattern thereon that facilitates movement of the switch between the first and second positions.

In another form of the invention, a line carrying spool is provided for a fishing reel, which spool has a body and settable structure on the body that can be placed selectively in at least first and second different states which are each detectable by a user. Settable structure is placeable selectively in the first state to give a user a detectable indication that a first type of line is on the spool and in a second state to give a user a detectable indication that a second type of line is on the spool.

BRIEF DESCRIPTION OF THE DRAWINGS

FIG. 1 is a side elevation view of one type of fishing reel having a spool with a line type indicator, according to the present invention, thereon;

FIG. 2 is an enlarged, fragmentary, cross-sectional view of the spool and line type indicator taken along line 2—2 of FIG. 1;

FIG. 3 is a side elevation view of a spool for a fishing reel of the type in FIG. 1 and with a modified form of line type indicator according to the present invention, thereon;

FIG. 4 is an enlarged, fragmentary, cross-sectional view of the spool and line type indicator taken along line 4—4 of FIG. 3;

FIG. 5 is a schematic, fragmentary, front elevation view of a second type of fishing reel having a spool with a line type indicator, according to the present invention, incorporated therein;

FIG. 6 is a cross-sectional view of a third type of fishing reel having a spool with a line type indicator, according to the present invention, incorporated therein; and FIG. 7 is an enlarged, side elevation view of the spool on the fishing reel in FIG. 6.

DETAILED DESCRIPTION OF THE DRAWINGS

In FIGS. 1 and 2, a spinning type fishing reel is shown at 10 having a spool 12 with a line type indicator at 14, according to the present invention, thereon. Briefly, the fishing reel 10 has a frame 16 with an operating mechanism, shown generally at 18, on the frame 16. A detailed description of the operating mechanism 18 is set forth in U.S. Pat. No. 5,004,182, which is incorporated herein by reference.

For purposes of this invention, it suffices to say that fishing line 22 is retrieved onto the spool 12 by rotating a crank handle 24. The crank handle 24, through a drive connection 26, causes a rotor 28 to rotate around a fore and aft axis 30. The rotor 28 carries a bail assembly 32 which wraps the line 22 around the spool 12 as the rotor 28 operates.

The spool 12 is movable reciprocatively in a fore and aft direction on the axis 30 through an oscillating system 34 that is part of the operating mechanism 18. This causes an even distribution of the wrapped line 22 on the spool 12.

The spool 12 is fully separable from a cantilevered, forward portion of a shaft 35, which is concentric with the axis 30. The spool 12 has a generally cylindrical body 36 with a front flange 38 and a rear flange 40 bounding a line storage space 42. The rear flange 40 blends into a cylindrical wall/skirt 44 which is designed to telescope over a cylindrical, forwardly projecting portion 46 on the rotor 28.

The inventive line type indicator 14 defines a settable means on the spool 12 that can be placed selectively in different states which are each detectable by a user to give the user an indication of which of a plurality of different types of line 22 are on the spool 12.

More particularly, the line type indicator 14 includes a groove 48 formed in the wall/skirt 44. A ring-shaped switch 50 having a substantially matched cross section to the groove 48, is guided within the groove 48 in a circumferential direction around the wall/skit 44. Preferably the depth of the groove 48 is such that the switch 50 does not project significantly outwardly therefrom. In FIG. 2, the spacing between the switch 50 and the guiding side walls 52, 54 and bottom wall 56 defining the groove 48 is slightly exaggerated to clarify this structure. Preferably, a relatively close friction fit is made between the switch 50 and the walls 52, 54, 56. In FIGS. 1 and 2, the groove 48 and switch 50 have an endless construction. The switch 50 can be made from a rubber or plastic material that allows it to stretch sufficiently to be placed around and slid relative to the external surface 58 of the wall/skirt 44. The material defining the switch 50 has sufficient memory that it will spring back to an undeformed state and thereby relatively closely grip the bottom wall 56 bounding the groove 48.

The outer surface 60 of the switch 50 has an indicator 62 thereon which is selectively alignable with indicating marks 64 on the external surface 58 of the wall/skirt 44. The indicating marks 64 are preferably numbers identifying line strength in "pound test". The indicator 62 is selectively alignable with the various indicating marks 64 by the user by simply gripping the outer surface 60 of the switch 50 and effecting a slight rotation thereof around the axis 30. It should be understood that the indicator 62 could be on the wall/skirt 44, with the indicating marks 64 being on the switch 50.

A close fit can be established between the switch 50 and the wall/skirt 44 within the groove 48 to frictionally hold the switch 50 in different positions. More preferably, a detent arrangement is incorporated consisting of a series of circumferentially spaced protrusions 66 on the switch 50 which move into recesses 68 in the bottom wall 56 bounding the groove 48. Of course the protrusions 66 could be provided on the wallskirt 44, with the recesses 68 being provided in the switch 50. With this arrangement, the protrusion 66 each align with and move into a recess 68 with the indicator 62 aligned with the indicating marks 64. A single protrusion 66 can be used to perform the same function. The protrusion and recess arrangement allows the switch 50 to be set and releasably maintained in a plurality of predetermined positions wherein the indicator 62 clearly points to one of the indicating marks 64.

A modified form of line type indicator, according to the present invention, is shown at 72 in FIGS. 3 and 4. The line type indicator 72 is mounted upon a spool 74 that is substantially the same as that in FIGS. 1 and 2. The spool 74 has a cylindrical wall/skirt 76 with a radial groove 78 formed therein and extending only partially around the external wall surface 80 of the wall/skirt 76.

In this embodiment, the groove 78 has an inverted T shape in cross section with a cooperating switch 82 having a complementary shape. In this case, the "cross bar"84 on the T-shaped switch 82 must be deformed slightly to allow it to seat between axially facing, undercut surfaces 86, 88 in the wall/skirt 76. Alternatively, an entry opening (not shown) can be provided in communication with the groove 78 to facilitate assembly of the switch 82. One or more protrusions 90 and recesses 92 are provided on each of the switch 82 and wall/skirt 76 and cooperate to releasably maintain the switch 82 in a plurality of different positions, wherein an indicator 94 on the switch 82 aligns with one indicating mark 95 on the spool 74. In this case, the circumferential extent of the groove 78 is slightly greater than that of the switch 82 to allow the switch 82 to be moved circumferentially within the groove 78 through the required range.

A raised pattern, that may be formed by a plurality of projections 96, is provided on the exposed, external surface 100 of the switch 82 to facilitate gripping and sliding movement of the switch 82 between the multiple, predetermined positions in which it is releasably held. The projections 96 may extend slightly radially outwardly from the wall/skit surface 80. More preferably, the surface 100 is slightly recessed radially within the groove 78 so as not to interfere with reel operation. The projections 96 can then be flush with or extend only slightly radially outwardly from the surface 80.

In FIG. 5, the inventive line type indicator is shown at 110 incorporated into a baitcast-type fishing reel 112. The fishing reel 112 has a frame 114 with laterally spaced frame parts 116, 118 which support an operating mechanism 120 for the reel 112. The operating mechanism includes a spool 122 having a central shaft 124 which extends through and is supported on the frame parts 116, 118. The line carrying portion 126 of the spool 122 spans between the side frame parts 116, 118. A drive mechanism 128, that is part of the reel operating mechanism 120, is operable to rotate the spool around an axis 130 to thereby wrap line around the spool portion 126. The spool portion 126 has a reduced diameter midportion 132 and increases in diameter progressively laterally oppositely away from the midportion 132 and terminates at laterally spaced flanges 134, 136. The flange 136 has an angled surface 138.

According to the invention, a switch 140 is mounted within a groove 142 on the flange 136 in the same manner as the switch 50 and switch 82 are mounted to their respective walls/skirts 44, 74. The switch 140 has indicating marks 146 thereon, with there being an indicator 148 on the flange 136 that is alignable selectively with the different indicating marks 146.

A detent arrangement, including protrusions and recesses (not shown), can be provided on the switch 140 and flange 136 as in the embodiments, previously described. Several other ways could be devised to releasably maintain the switch 140 and the other switches 50, 82 in a plurality of different positions by one skilled in this art.

A line type indicator 152 is shown incorporated into a spin cast/closed face fishing reel 154 in FIGS. 6 and 7. The reel 154 is described in detail in U.S. Pat. No. 5,427,325, which is incorporated herein by reference.

Briefly, the reel 154 has a frame 156 defiling a support for a reel operating mechanism 158. A cover 159 is mounted to the frame 156 and is removable to expose a spinner head 160 that is rotatable to direct line onto a spool 162. The spool 162 has spaced flanges 164, 166 between which a line storage space 168 is defined around a reduced diameter portion of the spool. The line type indicator 152 resides fully radially outside of the reduced diameter portion of the spool 162 relative to the central axis of the spool 162.

According to the invention, a switch 170 is mounted on the flange 164 in the same manner as are the switches 50, 82, 140. The switch 170 has indicating marks 172 thereon with an indicator 174 on the flange 164 being selectively alignable with the indicating marks 172. A detent arrangement can be incorporated to releasably maintain the switch 170 in a plurality of different positions.

The foregoing disclosure of specific embodiments is intended to be illustrative of the broad concepts comprehended by the invention.

I claim:

1. A fishing reel comprising:

a frame; and an operating mechanism on the frame, said operating mechanism comprising a shaft and a line carrying spool that is releasably fixedly mounted to the shaft and separable from the frame, the operating mechanism being operable for directing line onto the spool, a settable line type indicator on the spool having a part that is adapted to be moved relative to the spool and thereby selectively placed in at least first and second different states which are each detectable by a user, said settable line type indicator being placeable selectively in the first state to give a user a detectable indication that a first type of line is on the spool and in the second state to give a user a detectable indication that a second type of line is on the spool, said line carrying spool being maintained on the shaft independently of the settable line type indicator so that the line carrying spool can be changed between a first state wherein the line carrying spool is releasably fixedly mounted to the shaft and a second state wherein the line carrying spool is fully separated from the shaft without moving the part relative to the spool.

2. A fishing reel comprising:

a frame; and an operating mechanism on the frame, said operating mechanism comprising a line carrying spool that is separable from the frame, the operating mechanism being operable for directing line onto the spool, a settable line type indicator on the spool that is adapted to be selectively placed and releasably maintained in at least first and second different states which are each detectable by a user with the spool both on the frame and separated from the frame, said settable line tape indicator being placeable selectively in the first state to give a user a detectable indication that a first tape of line is on the spool and in the second state to give a user a detectable indication that a second type of line is on the spool, wherein the spool has a body and the settable line type indicator comprises a ring-shaped switch that is mounted to and maintained on the spool body with the spool both on the frame and separated from the frame for movement relative to the spool body between first and second positions corresponding to the first and second states for the settable line type indicator.

3. The fishing reel according to claim 2 wherein the settable line type indicator comprises first and second indicating marks on one of the spool body and the switch and an indicator on the other of the spool body and the switch, said indicator being alignable a) with the first indicating mark with the settable line type indicator in the first state and b) with the second indicating mark with the settable line type indicator in the second state.

4. The fishing reel according to claim 2 wherein the switch extends continuously around a part of the spool body.

5. The fishing reel according to claim 2 wherein the spool has a central axis, the spool body has a curved surface facing radially outwardly with respect to the central axis of the spool and the switch is mounted at the curved surface.

6. The fishing reel according to claim 5 wherein the switch has a curvature matched to the curved surface.

7. The fishing reel according to claim 2 wherein there is a detent arrangement on the switch and spool body to releasably maintain the switch consistently in each of the first and second positions.

8. The fishing reel according to claim 2 wherein the spool has a central axis, the settable line type indicator comprises a groove on the spool body opening radially outwardly relative to the spool central axis and a surface on the switch that moves guidingly within the groove as the switch moves between the first and second positions.

9. The fishing reel according to claim 8 wherein the spool has a substantially cylindrical shape with an external wall having a curvature and the groove and the surface that moves in the groove are curved to match the curvature of the external spool wall.

10. The fishing reel according to claim 9 wherein at least one of the groove and the surface that moves in the groove extends continuously around the spool body.

11. The fishing reel according to claim 9 wherein the external wall has a substantially cylindrical outer surface and the switch does not extend significantly radially outwardly from the cylindrical outer surface.

12. The fishing reel according to claim 9 wherein the switch has an exposed surface with a raised pattern thereon that facilitates engagement by a user and movement of the switch between the first and second positions.

13. A line carrying spool for a fishing reel, said line carrying spool comprising:

a body having an axis, axially spaced flanges bounding a line storage space and a reduced diameter portion between the flanges with the spaced flanges and the reduced diameter portion defining a unitary subassembly that is rotatable as one piece around the axis of the body with the unitary subassembly separated from a fishing reel to which the unitary subassembly can be assembled; and a settable line type indicator on the united subassembly that is adapted to be placed selectively in at least first and second different states which are detectable by a user, said settable line type indicator comprising a switch that is maintained on the unitary subassembly with the unitary subassembly separated from a fishing reel to which the unitary subassembly can be assembled and guided in movement directly against and relative to the unitary subassembly so that the settable line type indicator is placeable selectively in the first state to give a user a detectable indication that a first type of line is on the spool and in the second state to give a user a detectable indication that a second type of line is on the spool, wherein the settable line type indicator resides fully radially outside of the reduced diameter portion relative to the axis of the body.

14. The fishing reel according to claim 13 wherein the settable line type indicator comprises a detent arrangement cooperating between the switch and spool body for releasably maintaining the switch consistently in each of the first and second positions.

15. A line carrying spool for a fishing reel, said line carrying spool comprising:

a body having an axis, axially spaced flanges bounding a line storage space and a reduced diameter portion between the flanges with the spaced flanges and the reduced diameter portion defining a unitary subassembly that is rotatable as one piece around the axis of the body with the unitary subassembly separated from a fishing reel to which the unitary subassembly can be assembled; and a settable line type indicator on the unitary subassembly that is adapted to be placed selectively in at least first and second different states which are detectable by a user, said settable line type indicator comprising a switch that is maintained on the unitary subassembly with the unitary subassembly separated from a fishing reel to which the unitary subassembly can be assembled and guided in movement directly against and relative to the unitary subassembly so that the settable line type indicator is placeable selectively in the first state to give a user a detectable indication that a first type of line is on the spool and in the second state to give a user a detectable indication that a second type of line is on the spool, wherein the settable line type indicator comprises first and second indicating marks on one of the s pool body and the switch and an indicator on the other of the spool body and the switch, said indicator being alienable a) with the first indicating mark with the settable line type indicator in the first state and b) with the second indicating mark with the settable line type indicator in the second state.

16. A line carrying spool for a fishing reel, said line carrying spool comprising:

a body having an axis axially spaced flanges bounding a line storage space and a reduced diameter portion between the flanges with the spaced flanges and the reduced diameter portion defining a unitary subassembly that is rotatable as one piece around the axis of the body with the unitary subassembly separated from a fishing reel to which the unitary subassembly can be assembled; and a settable line type indicator on the unitary subassembly that is adapted to be placed selectively in at least first and second different states which are detectable by a user, said settable line type indicator comprising a switch that is maintained on the unitary subassembly with the unitary subassembly separated from a fishing reel to which the unitary subassembly can be assembled and guided in movement directly against and relative to the unitary subassembly so that the settable line type indicator is placeable selectively in the first state to give a user a detectable indication that a first type of line is on the spool and in the second state to give a user a detectable indication that a second type of line is on the spool, wherein the switch extends continuously around a part of the spool body.

17. A line carrying spool for a fishing reel, said line carrying spool comprising:

a body having an axis, axially spaced flanges bounding a line storage space and a reduced diameter portion between the flanges with the spaced flanges and the reduced diameter portion defining a unitary subassembly that is rotatable as one piece around the axis of the body with the unitary subassembly separated from a fishing reel to which the unitary subassembly can be assembled; and a settable line type indicator on the unitary subassembly that is adapted to be placed selectively in at least first and second different states which are detectable by a user, said settable line type indicator comprising a switch that is maintained on the unitary subassembly with the unitary subassembly separated from a fishing reel to which the unitary subassembly can be assembled and guided in movement directly against and relative to the unitary subassembly so that the settable line type indicator is placeable selectively in the first state to give a user a detectable indication that a first type of line is on the spool and in the second state to give a user a detectable indication that a second type of line is on the spool, wherein the spool body has a curved external surface facing radially outwardly with respect to the axis of the body and the switch is mounted at the curved external surface.

18. A line carrying spool for a fishing reel, said line carrying spool comprising:

a body having an axis, axially spaced flanges bounding a line storage space and a reduced diameter portion between the flanges with the spaced flanges and the reduced diameter portion defining a unitary subassembly that is rotatable as one piece around the axis of the body with the unitary subassembly separated from a fishing reel to which the unitary subassembly can be assembled; and a settable line type indicator on the unitary subassembly that is adapted to be placed selectively in at least first and second different states which are detectable by a user, said settable line type indicator comprising a switch that is maintained on the unitary subassembly with the unitary subassembly separated from a fishing reel to which the unitary subassembly can be assembled and guided in movement directly against and relative to the unitary subassembly so that the settable line type indicator is placeable selectively in the first state to give a user a detectable indication that a first type of line is on the spool and in the second state to give a user a detectable indication that a second type of line is on the spool, wherein the settable line type indicator comprises a groove on one of the switch and spool body opening radially outwardly relative to the axis of the body and a surface on the other of the switch and spool that moves guidingly within the, groove as the switch moves between the first and second positions.

19. The fishing reel according to claim 18 wherein the spool has a substantially cylindrical shape with an external wall having a curvature and the groove and the surface that moves in the groove are curved to match the curvature of the external spool wall.

20. The fishing reel according to claim 19 wherein the groove and the surface that moves in the groove extend continuously around the spool body.

21. The fishing reel according to claim 19 wherein the external wall has a substantially cylindrical outer surface and the switch does not extend significantly radially outwardly from the cylindrical outer surface of the external wall.

* * * * *